Oct. 26, 1965   G. H. ECKELS   3,213,948
DERRICK
Filed March 12, 1962                               2 Sheets-Sheet 1

INVENTOR.
GEORGE H. ECKELS
BY
Teare, Fetzer + Teare
ATTORNEYS

Oct. 26, 1965  G. H. ECKELS  3,213,948
DERRICK
Filed March 12, 1962  2 Sheets-Sheet 2
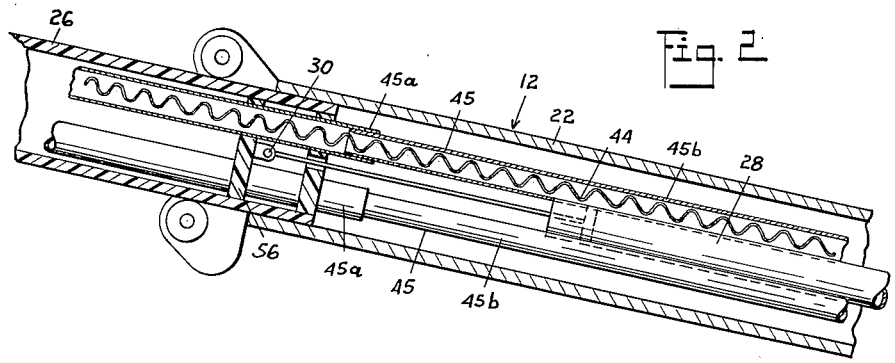
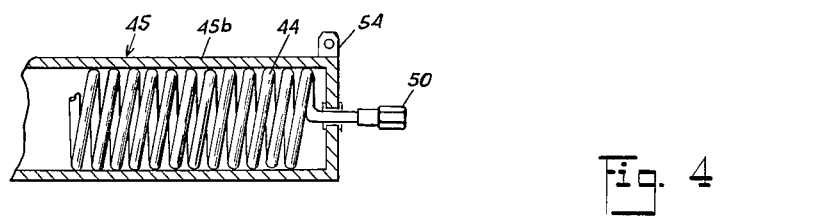
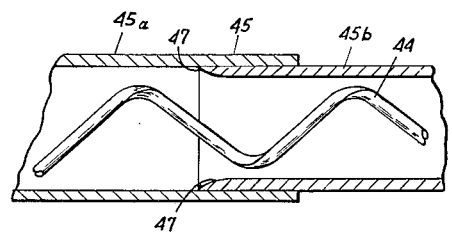
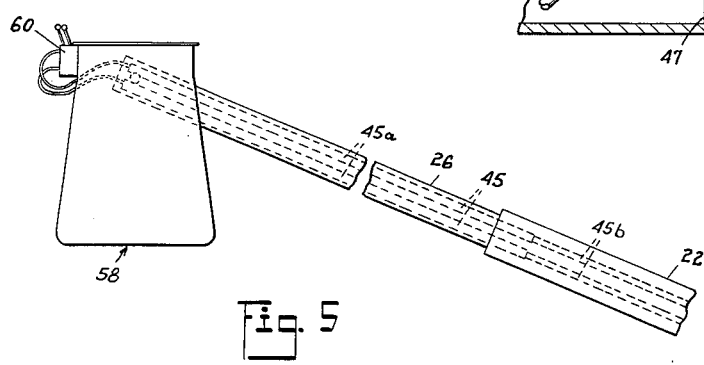
INVENTOR.
GEORGE H. ECKELS
BY
Teare, Fetzer & Teare
ATTORNEYS

United States Patent Office 3,213,948
Patented Oct. 26, 1965

3,213,948
DERRICK
George H. Eckels, Lakewood, Ohio, assignor, by mesne assignments, to The Ohio Brass Company, Mansfield, Ohio, a corporation of New Jersey
Filed Mar. 12, 1962, Ser. No. 178,926
3 Claims. (Cl. 173—159)

This invention relates in general to derricks or cranes, and more particularly to a derrick, crane or tower wherein the boom thereof may be selectively and generally telescopically, extended and retracted, for adjusting the operating range of the derrick.

The derrick or like apparatus of the invention is illustrated as being of a portable type, mounted on a utility type vehicle, and one which may be adapted for handling and erecting various objects, such as telephone or telegraph poles, or may be used for elevating a workman adjacent an overhead object, such as power lines, street lights or the like.

In the copending United States patent application of George H. Eckels, Serial No. 102,458, filed April 12, 1961, now Patent 3,073,396, there is disclosed a portable type derrick mounted on the utility type vehicle for handling various objects, and which derrick is adapted to be employed to advantage in conjunction with other types of equipment, such as for instance an earth boring tool, for performing all of the necessary work operations associated with setting a utility line pole in proper place along a thoroughfare or the like. The derrick disclosed in such pending application comprises a sectional, extensible boom and includes means on the boom for attaching an associated work mechanism, such as an earth boring tool to the boom, and for adjusting the position of the work mechanism lengthwise along the boom, and wherein telescoping, fluid transmission lines are mounted on the derrick boom, providing for effective transmission of actuating fluid along the boom to a fluid powered motor unit of the earth boring tool, irrespective of the supported position of the tool with respect to the boom, thereby preventing any slack from occurring in the fluid transmission lines.

The present invention provides a novel arrangement of fluid transmission lines which are of a pretensioned, coiled nature, adapted to be mounted on or in an extensible boom, and which are effective for providing for the transmission of actuating fluid along the boom in any extended or retracted condition of the latter, and which may automatically extend and retract with the extension and retraction of the boom.

Accordingly an object of the invention is to provide an arrangement of reciprocal or extensible type derrick or tower boom having a novel arrangement of fluid transmission line means associated therewith.

Another object of the invention is to provide a novel arrangement of extensible, pretensioned coiled fluid transmission line means for use in transmitting actuating fluid along an extensible boom.

A more specific object of the invention is to provide a portable type derrick or tower including a sectional, extensible boom, for telescopically varying the effective length of the boom, and wherein there is provided a novel extensible arrangement of fluid transmission line means associated with the boom, for transmission of pressurized fluid along the boom and during extension and retraction of the boom, and wherein such fluid transmission line means comprises a capsulated, pretensioned, flexible coiled conduit adapted for disposal within the telescoped boom sections.

Other objects and advantages of the invention will be apparent from the following description taken in conjunction with accompanying drawings wherein:

FIG. 2 is an enlarged, fragmentary, sectional view of the extensible boom sections, together with a reciprocal fluid powered motor means for extending and retracting the boom sections, and illustrating the capsulated pretensioned coiled form fluid transmission line means associated with the boom sections;

FIG. 3 is an enlarged, fragmentary, sectional view of the capsulated fluid transmission line means of the invention in non-extended condition;

FIG. 4 is an enlarged, fragmentary, sectional view of the telescoped capsule surrounding the coiled fluid transmission line means of the invention, with such line means being disposed in extended condition due to extension of the surrounding capsule sections;

FIG. 5 is a fragmentary side elevational view of another form of the extendible boom and one having a personnel bucket mounted on the outer end thereof, and with such boom including the pretensioned coiled fluid transmission line means of the invention.

Figure 1:
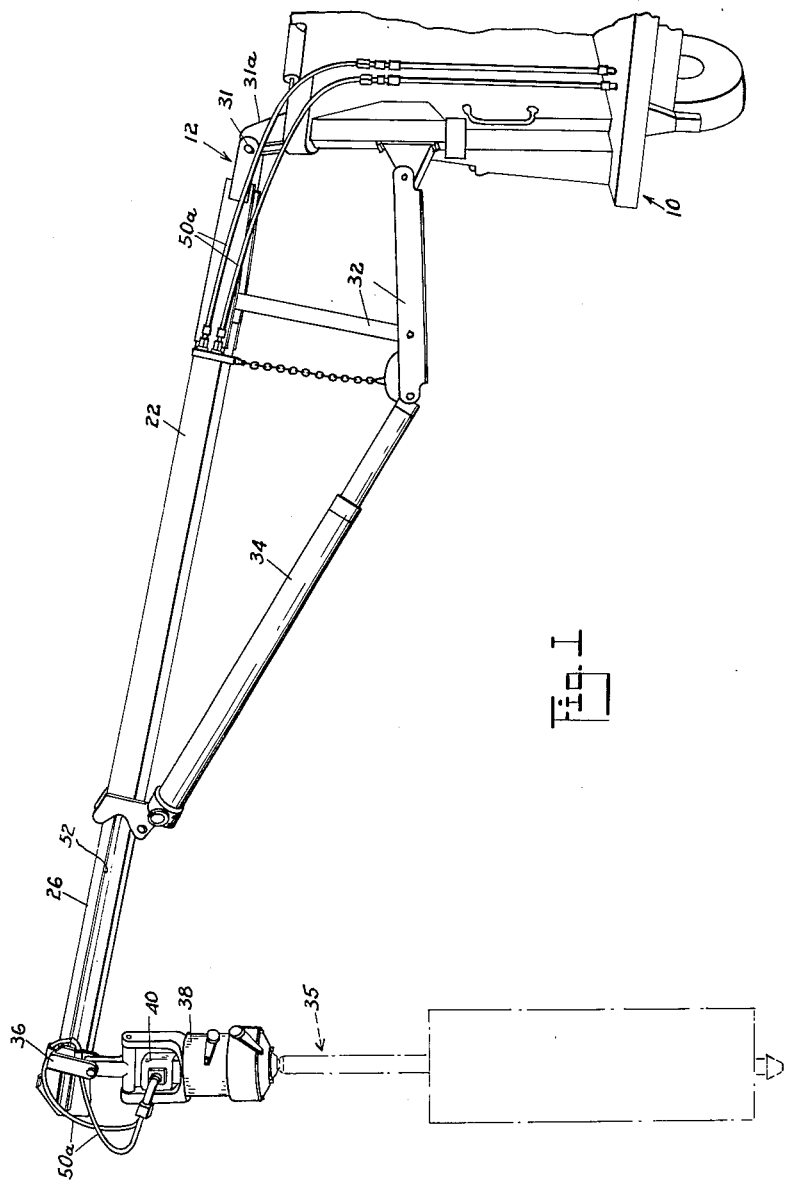
FIG. 1 is a fragmentary side elevational view of an extensible derrick boom carrying an earth boring tool on the boom, and one embodying the extensible and retractable fluid transmission line arrangement of the invention.

Referring now to the drawings, and in particular to FIG. 1, there is shown a fragmentary portion of a wheeled utility vehicle 10 having a truck body which carries a movable derrick 12 thereon. The derrick boom embodies an inner or lower relatively stationary, generally hollow section 22, and also embodies an outer, generally hollow extendible section 26, which may be received in telescoping relation in the lower or inner section 22 of the boom. A reciprocal fluid powered motor unit 28 (FIG. 2) may be disposed interiorly of the boom sections, and is coupled at one end to the inner one of the boom sections, and at the other end, as at 30, is coupled to the other or outer boom section, for extension and retraction of the boom sections in a manner known in the art.

The boom, in the embodiment illustrated, is pivotally mounted as at 31 to base structure 31a, and a linkage erecting or actuating arrangement 32 is provided, together with a double acting reciprocal fluid powered motor unit or ram 34, for moving the derrick in a generally vertical plane and through an arc of movement which may be in excess of 180°. The base structure 31a may also be so arranged so as to be swingable in a generally horizontal plane, and in a known manner. Reference may be had to the aforementioned copending patent application for a more detailed description of the derrick structure per se.

In the embodiment illustrated, an earth boring mechanism or tool 35 is selectively couplable to either the extendible section 26 of the boom or to the relatively stationary section 22 of the boom. This arrangement may comprise a tool supporting member 36 mounted on the extendible section 26 of the boom, and which is adapted for connection in a known manner to a transmission housing 38 of the earth boring tool 35. A latching arrangement (not shown) may be provided so that the tool supporting member or collar 36 can be coupled to either the relatively stationary inner section 22 of the boom, or may be coupled to the extendible section 26 of the boom, to permit carrying of the work tool outwardly with the boom and adjustment of the position of the tool lengthwise with respect to the boom, for the full operating range of the boom extension. In other words, the outer boom section 26 may be moved lengthwise relative to the tool supporting member 36 when the latter is coupled to the inner boom stction 22, and in a manner known in the art.

Now in accordance with the instant invention, there is provided a novel arrangement of extensible and retractable fluid transmission line means for transmitting pressurized actuating fluid from a source of supply located, for instance, on the vehicle, along the derrick boom, and to, for instance, the aforementioned fluid driven, reversible, rotary motor unit 40 of the work mechanism 35. Such fluid transmission lines takes the form of pretensioned coiled lines 44, which may be formed of plastic, metal, or any other suitable material which may be disposed in coiled pretensioned form in the general manner of a spring, so that it will tend to retract upon removal of an elongating or tensioning force. Each of such fluid transmission lines is preferably encapsulated in a housing 45 comprising telescopically arranged tubular sections 45a, 45b, which may be formed of any suitable material, such as for instance, reinforced fiberglass structures, that surround the coiled fluid transmission lines and protect and guide them during the extension and retraction of such lines due for instance to the extension and retraction of the outer boom section.

Referring now in particular to FIG. 4, the outer seciton 45a of the capsule, preferably encompasses the inner section 45b as shown, and with such inner section as its telescoping end being tapered as at 47 toward the outer or free end of the boom, so that as the capsule sections retract and expand with respect to one another, the coiled tubular fluid transmission lines will not be injured or caught on the relatively moving capsule sections. The transverse size of the capsule sections is preferably substantially that of the transverse size of the fluid transmission lines when the coils thereof are disposed in collapsed condition, and as shown in FIG. 3. As the coiled fluid transmission line is extended with, for instance, the extension of the boom, the transverse width of the coiled body of the fluid transmission line may decrease somewhat due to tensioning of the line. Upon retraction of the outer boom section with respect to the inner boom section, the resistance to extension or elastic memory of the fluid transmission line coils causes retraction of the line and takes up any slack in the line.

The ends of the extendible coiled lines may be provided with conventional fittings (e.g. 50) for attachment to relatively stationary conduits 50a, disposed between the source of pressurized fluid and the mechanism to be actuated by such fluid. As shown in FIG. 1, the outer extendible section 26 of the boom may be provided with an elongated slot 52 therein for passage of the ends of the coiled transmission lines of the capsule sections 45a therethrough, thereby providing for relative movement between the tool support 36 and its associated tool 35 and the boom section 26. With the tool support arrangement shown in FIG. 1, it will be seen that the outer section 45a of the housing 45 is coupled to and moves with the tool support 36 and associated tool, and relative to the inner section 45b of the housing 45, and with the latter section 45b being stationary with respect to inner section 22 of the boom. Any suitable means, such as lugs 54 may be provided for mounting housing section 45b in section 22 of the boom, and apertured partitions 56 disposed in outer section 26 of the boom may slidably support outer housing section 45a in boom section 26.

Referring now to FIG. 5, there is shown a fragmentary portion of a powered boom or tower having a personnel support bucket 58 disposed or swingably mounted in cantilever fashion on the outer end thereof, and having for instance fluid valve control means 60 of conventional type mounted on the bucket, and adapted to be actuated by workmen disposed in the bucket. The valve control means 60 could control, for instance, the application of fluid pressure to the motor unit for extending and retracting the boom, and the application of fluid pressure to the pressure actuated means (e.g. 34) for moving the boom with respect to its support. The coiled pretensioned fluid transmission line means of the invention may be disposed in the boom in a similar manner as aforediscussed in connection with the first disclosed embodiment and will be effective to prevent any slack in the fluid transmission lines during the retraction and extension of the boom with the support bucket on the outer end thereof. The capsule sections 45a, 45b may be supported by the respective boom section, and at the ends thereof will permit passage of the fluid transmission tubes therethrough in a similar manner as the first described embodiment. However, since the bucket does not move lengthwise with respect to its supporting boom section 26, the outer housing sections 45a may be mounted stationary with respect to the encompassing boom section 26.

From the foregoing discussion and accompanying drawings, it will be seen that the invention provides a novel arrangement of flexible coiled, fluid transmission line means for an extensible boom, for preventing any slack from occurring in the fluid transmission line means, and for instance, during retraction and extension of the boom.

The terms and expressions which have been used are used as terms of description and not of limitation, and there is no intention in the use of such terms and expressions of excluding any equivalents of any of the features shown or described, or portions thereof, and it is recognized that various modifications are possible within the scope of the invention claimed.

I claim:

1. In a portable-type derrick having an extensible boom, said boom comprising a stationary inner tubular section and an outer tubular section having guide means disposed interiorly thereof and fixed to said outer tubular section, said outer tubular section disposed in telescopic coacting engagement interiorly of said inner tubular section for varying the effective length of said boom, means on said boom mounting an associated work mechanism, an inner capsule section mounted generally stationary interiorly of said inner tubular boom section, an outer capsule section mounted within and disposed for sliding movement within the guide means interiorly of said outer tubular boom section, one end of said outer capsule section encompassing the associated end of said inner capsule section for telescopic coacting movement lengthwise of said inner capsule section upon movement of said outer tubular section, a reciprocal motor means coupled to said inner tubular section and to said guide means for selective extension and retraction of said outer tubular boom end capsule section, and a pretensioned coiled conduit disposed interiorly of said inner and outer capsule sections for resilient extension and retraction upon actuation of said motor means, said conduit projecting from one end of said inner capsule section and connected to a source of pressurized operating fluid, and connected at the other end to said work mechanism.

2. In a portable-type derrick according to claim 1, wherein the pretensioned conduit is formed from polymeric material, such as plastic or the like, and wherein the conduit coil outer diameter is substantially the same as the inner diameter of the inner capsule section when disposed in the collapsed condition thereof.

3. In a portable-type derrick according to claim 1, wherein the inner wall of the telescoping end of said inner capsule section is flared radially in the general direction of said encompassing outer capsule section to facilitate resilient extension and retraction of said conduit upon actuation of said motor means.

References Cited by the Examiner
UNITED STATES PATENTS

| | | | |
|---|---|---|---|
| 2,815,191 | 12/57 | Beltz | 175—123 |
| 2,905,194 | 9/59 | Smith et al. | 138—107 |
| 2,979,152 | 4/61 | Eitel | 182—2 |
| 2,988,163 | 6/61 | Foley | 182—2 |
| 3,017,935 | 1/62 | Galbraith | 175—123 |
| 3,073,396 | 1/63 | Eckels | 173—38 |
| 3,073,455 | 1/63 | Eckels et al. | 173—28 |
| 3,116,840 | 1/64 | Carbert et al. | 173—28 |

FOREIGN PATENTS 526,979   9/40   Great Britain.

BROUGHTON G. DURHAM, *Primary Examiner.*

GEORGE L. BREHM, *Examiner.*